US009311262B2

(12) United States Patent
Hioki

(10) Patent No.: US 9,311,262 B2
(45) Date of Patent: Apr. 12, 2016

(54) TRANSMISSION CONTROL DEVICE, MEMORY CONTROL DEVICE, AND PLC INCLUDING THE TRANSMISSION CONTROL DEVICE

(75) Inventor: Eitarou Hioki, Chiyoda-ku (JP)

(73) Assignee: Mitsubishi Electric Corporation, Tokyo (JP)

( * ) Notice: Subject to any disclaimer, the term of this patent is extended or adjusted under 35 U.S.C. 154(b) by 596 days.

(21) Appl. No.: 13/576,613

(22) PCT Filed: Feb. 9, 2010

(86) PCT No.: PCT/JP2010/000768
§ 371 (c)(1),
(2), (4) Date: Aug. 1, 2012

(87) PCT Pub. No.: WO2011/099048
PCT Pub. Date: Aug. 18, 2011

(65) Prior Publication Data
US 2012/0303915 A1    Nov. 29, 2012

(51) Int. Cl.
*G06F 12/00* (2006.01)
*G06F 13/38* (2006.01)
(Continued)

(52) U.S. Cl.
CPC ............ *G06F 13/385* (2013.01); *G06F 3/06* (2013.01); *G06F 3/061* (2013.01); *G06F 3/0601* (2013.01); *G06F 3/065* (2013.01); *G06F 3/0628* (2013.01); *G06F 3/0683* (2013.01); *G06F 3/0689* (2013.01); *G06F 9/466* (2013.01); *G06F 9/467* (2013.01); *G06F 11/1451* (2013.01); *G06F 11/1666* (2013.01); *G06F 13/00* (2013.01);
(Continued)

(58) Field of Classification Search
USPC .................. 711/100, 154, 161, 162, 170
See application file for complete search history.

(56) References Cited

U.S. PATENT DOCUMENTS 3,833,892 A * 9/1974 Marsalka et al. ............. 713/502
2002/0191218 A1 12/2002 Kato
(Continued)

FOREIGN PATENT DOCUMENTS

CN    1761947 A    4/2006
JP    01-198143 A   8/1989
(Continued)

OTHER PUBLICATIONS

Japanese Office Action, Notice of Rejection, dated Jul. 30, 2013, Patent Application No. 2011-553607.
(Continued)

*Primary Examiner* — Midys Rojas
(74) *Attorney, Agent, or Firm* — Sughrue Mion, PLLC; Richard C. Turner

(57) ABSTRACT

A transmission control device in the present invention includes: a data storage memory in which data are written; a plurality of data copy memories into which the data written in the data storage memory are copied; an unread copy-memory selection unit that selects one of the data copy memories for which reading of data is not performed from among the data copy memories; a memory copy unit that copies the data written in the data storage memory into a data copy memory selected by the unread copy-memory selection unit; a read copy-memory selection unit that selects a data copy memory into which the memory copy unit copies data from among the data copy memories; and a data output unit that reads data from a data copy memory selected by the read copy-memory selection unit and outputs the read data to a transmission unit.

17 Claims, 6 Drawing Sheets

(51) Int. Cl.
*G06F 3/06* (2006.01)
*G06F 11/16* (2006.01)
*G06F 9/46* (2006.01)
*G06F 13/16* (2006.01)
*G06F 11/14* (2006.01)
*G06F 13/00* (2006.01)

(52) U.S. Cl.
CPC ........ *G06F 13/1657* (2013.01); *G06F 13/1673* (2013.01); *G05B 2219/15067* (2013.01); *G06F 2213/3808* (2013.01)

(56) References Cited

U.S. PATENT DOCUMENTS

| | | | |
|---|---|---|---|
| 2003/0105931 | A1 | 6/2003 | Weber et al. |
| 2004/0186945 | A1* | 9/2004 | Jeter et al. .......................... 711/5 |

FOREIGN PATENT DOCUMENTS

| | | |
|---|---|---|
| JP | 03-129403 A | 6/1991 |
| JP | 2510261 B2 | 6/1996 |
| JP | 2001-134421 A | 5/2001 |
| TW | 200805069 A | 1/2008 |
| TW | 200847182 A | 12/2008 |

OTHER PUBLICATIONS

Office Action dated Apr. 29, 2014, in counterpart Taiwanese Application No. 099111362.

Office Action dated Mar. 24, 2014, issued by the Korean Patent and Trademark Office in counterpart Koren Application No. 10-2012-7021230.

Office Action dated Jul. 3, 2014, issued by the Chinese Patent and Trademark Office in counterpart Chinese Application No. 201080063389.4.

DekTec: DTA-140. DVB/ASI Input+Output Adapter for PCI Bus, Feb. 2003, pp. 1-5, pp. 15-18, and pp. 35-37. URL: http://www.dektec.com/products/PCI/DTA-140/Downloads/DTA-140.pdf [retrieved Oct. 21, 2015].

Wang et al., Design and Implementation of Portable GNSS Baseband Logger, 2nd IEEE International Conference on Computer Science and Information Technology, 2009, ICCSIT 2009, Beijing: IEEE, 2009, pp. 642-646, ISBN 978-1-4244-4520-2.

Bell, Texas Instruments: TMS320C6000 DMA Example Applications, Digital Signal Processing Solutions, Apr. 2002, pp. 1-4, pp. 10-27, URL: http://www.ti.com/lit/an/spra529a/spra529a.pdf [retrieved on Oct. 21, 2015].

Zhang Guolong et al., High-speed and Real-time Communication Controller for Embedded Integrated Navigation System, International Conference on Intelligent Human-Machine Systems and Cybernetics, 2009, pp. 331-334, ISBN 978-0-7695-3752-8, http://ieeexplore.ieee.org/xpls/abs_all.jsp?arnumber=5336152 [retrieved on Oct. 21, 2015].

Marvell: 88F6180, 88F6190, 88F6192, and 88F6281, Integrated Controller, Functional Specifications, Dec. 2, 2008, 10 pages total, URL: http://www.marvell.com//embedded-processors/kirkwood/assets/FS_88F6180_9x_6281_OpenSource.pdf [retrieved on Oct. 21, 2015].

Multiple buffering, From Wikipedia, the free encyclopedia, Feb. 2, 2010, 4 pages total, URL: https://en.wikipedia.org/w/index.php?title=Multiple_buffering&oldid=341502517 [retrieved on Oct. 21, 2015].

Communication dated Oct. 21, 2015, issued by the German Patent and Trademark Office in corresponding German Application No. 11 2010 005 243.3.

* cited by examiner

TRANSMISSION CONTROL DEVICE, MEMORY CONTROL DEVICE, AND PLC INCLUDING THE TRANSMISSION CONTROL DEVICE

CROSS REFERENCE TO RELATED APPLICATION

This application is a National Stage of International Application No. PCT/JP2010/000768, filed on Feb. 9, 2010, the contents of all of which are incorporated herein by reference in their entirety.

FIELD

The present invention relates to a transmission control device, a memory control device, and a programmable logic controller (hereinafter, "PLC") including the transmission control device, which are intended to output transmit data written from an arithmetic device in the PLC as indivisible data to a transmission line.

BACKGROUND

A PLC controls an arithmetic device to execute a control program stored therein to generate transmit data, and transmits the transmit data as indivisible data to another PLC or the like via a transmission line. In this explanation, the indivisible data mean a series of data that is constituted by a plurality of pieces of information, the original meaning of which can not be grasped if the data are divided. Therefore, it is necessary to transmit the indivisible data without being divided.

Different settings are made for a time required to execute one cycle of a control program and a timing of generating transmit data during the execution of the control program among control systems each including the PLC, and the time and timing can vary from time to time during the execution of the control program. Meanwhile, transmit data generated by the arithmetic device are transmitted to a transmission line according to a transmission system (such as Time Division Multiple Access: TDMA) specified for the transmission line in advance. Therefore, it is often required for the arithmetic device to asynchronously carry out generation of the transmit data and transmission of the transmit data to the transmission line. Even in this case, it is necessary to guarantee to transmit the transmit data as indivisible data (hereinafter, such transmission condition is referred to as "simultaneity of the indivisible data") when transmitting the transmit data to the transmission line.

As a technique for solving such a problem, there is a technique disclosed in Patent Literature 1.

CITATION LIST

Patent Literature

Patent Literature 1: Japanese Patent No. 2510261

SUMMARY

Technical Problem

However, Patent Literature 1 has the following problem. That is, when an access time of a second system controller is longer than a non-access time of a first system controller, it is impossible to write all the indivisible data outputted from the first system controller in a first memory and impossible to guarantee the simultaneity of the indivisible data.

Furthermore, while the data temporarily stored in the first memory is being written into a second or third memory, the first system controller is required to be on standby without being able to write new data in the first memory, thereby causing a problem of taking a longer time of executing the control program. In addition, this disadvantageously causes delay in the output of the transmit data to the transmission line.

Solution to Problem

A transmission control device in the present invention is characterized in that it comprises: a data storage memory in which data are written; a plurality of data copy memories into which the data written in the data storage memory are copied; an unread copy-memory selection unit that selects one data copy memory from which the data are not read out, from among the data copy memories; a memory copy unit that copies data written in the data storage memory into a data copy memory selected by the unread copy-memory selection unit; a read copy-memory selection unit that is on standby until the memory copy unit has completed copying data, and selects a data copy memory into which the data has been copied when the memory copy unit has completed copying the data; and a data output unit that reads data from a data copy memory selected by the read copy-memory selection unit and outputs the read data to a transmission unit when reading of the data from the data copy memories and outputting of the data to the transmission unit are not performed, and the read copy-memory selection unit selects the data copy memory.

A memory control device in the present invention is characterized in that it comprises: a data storage memory in which data are written; a data storage queue that stores data inputted from outside in a queue form till the queue is given a transmission request signal from outside; a queue control unit that reads data from the data storage queue and writes the read data in the data storage memory; a data mirror memory that stores a copy of the inputted data; a mirror-memory writing unit that copies the inputted data and writes the copied data in the data mirror memory; and a data-mirror-memory reading unit that reads the data stored in the data mirror memory and outputs the read data to outside.

A PLC in the present invention is characterized in that it comprises: the transmission control device mentioned above; and an arithmetic unit that executes a control program to generate data, inputs the generated data to the transmission control device, and then transmits a transmission request signal to the transmission control device.

Advantageous Effects of Invention

According to the present invention, even if writing of the transmit data that are indivisible data to the transmission control device in the arithmetic device and outputting of the transmit data to the transmission line in the transmission control device are performed asynchronously, it is possible to prevent access competition between writing and reading of the transmit data while guaranteeing simultaneity of the indivisible data. Therefore, it is possible to reduce a standby time for the writing or reading of the transmit time, and to reduce a control-program execution cycle. Furthermore, it is possible to reduce delay in the output of the transmit data to the transmission line.

REFERENCE SIGNS LIST

100 PLC
101 ARITHMETIC DEVICE
102 TRANSMISSION CONTROL DEVICE
120 QUEUE CONTROL UNIT
121 QUEUE WRITING DEVICE
122 QUEUE READING DEVICE
123 QUEUE CONTROL DEVICE
124 TRANSMIT-DATA OUTPUT DEVICE
130 TRANSMIT-DATA STORAGE QUEUE
140 TRANSMIT-DATA MIRROR MEMORY
141 MIRROR-MEMORY WRITING DEVICE
142 MIRROR-MEMORY READING DEVICE
150 MEMORY-COPY CONTROL DEVICE
160 STORAGE MEMORY SELECTOR
170 TRANSMIT-DATA STORAGE MEMORY
180 MEMORY-COPY EXECUTION DEVICE
190 COPY MEMORY SELECTOR
190a FIRST COPY MEMORY SELECTOR
190b SECOND COPY MEMORY SELECTOR
190c THIRD COPY MEMORY SELECTOR
200 MEMORY-SELECTOR CONTROL UNIT
201 MEMORY-SELECTOR CONTROL DEVICE
202 UPDATE-STATUS FLAG MEMORY
203 TRANSMISSION-STATUS FLAG MEMORY
204 COPY-MEMORY-DISPLAY FLAG MEMORY
210 TRANSMIT-DATA COPY MEMORY
210a FIRST TRANSMIT-DATA COPY MEMORY
210b SECOND TRANSMIT-DATA COPY MEMORY
220 TRANSMISSION DEVICE
300 TRANSMISSION LINE
410 TRANSMIT DATA
411 TRANSMISSION REQUEST SIGNAL
412 READ-OPERATION SWITCHING SIGNAL
413 COPY EXECUTION SIGNAL
414 STORAGE-MEMORY SWITCHING SIGNAL
415 FIRST COPY-MEMORY SWITCHING SIGNAL
416 SECOND COPY-MEMORY SWITCHING SIGNAL
417 THIRD COPY-MEMORY SWITCHING SIGNAL
421 MEMORY-COPY-EXECUTION REQUEST SIGNAL
431 MEMORY-COPY-START NOTIFICATION SIGNAL
432 FIRST MEMORY-COPY COMPLETION NOTIFICATION SIGNAL
433 SECOND MEMORY-COPY-COMPLETION NOTIFICATION SIGNAL
441 TRANSMISSION-START NOTIFICATION SIGNAL
442 TRANSMISSION-COMPLETION NOTIFICATION SIGNAL

DESCRIPTION OF EMBODIMENTS

First Embodiment

A first embodiment of the present invention is described with reference to FIGS. 1 to 6. In the present embodiment, it is assumed that transmit data generated by an arithmetic device is indivisible data. The description is made also assumed that a transmission system for a transmission line is TDMA system.

Figure 1:
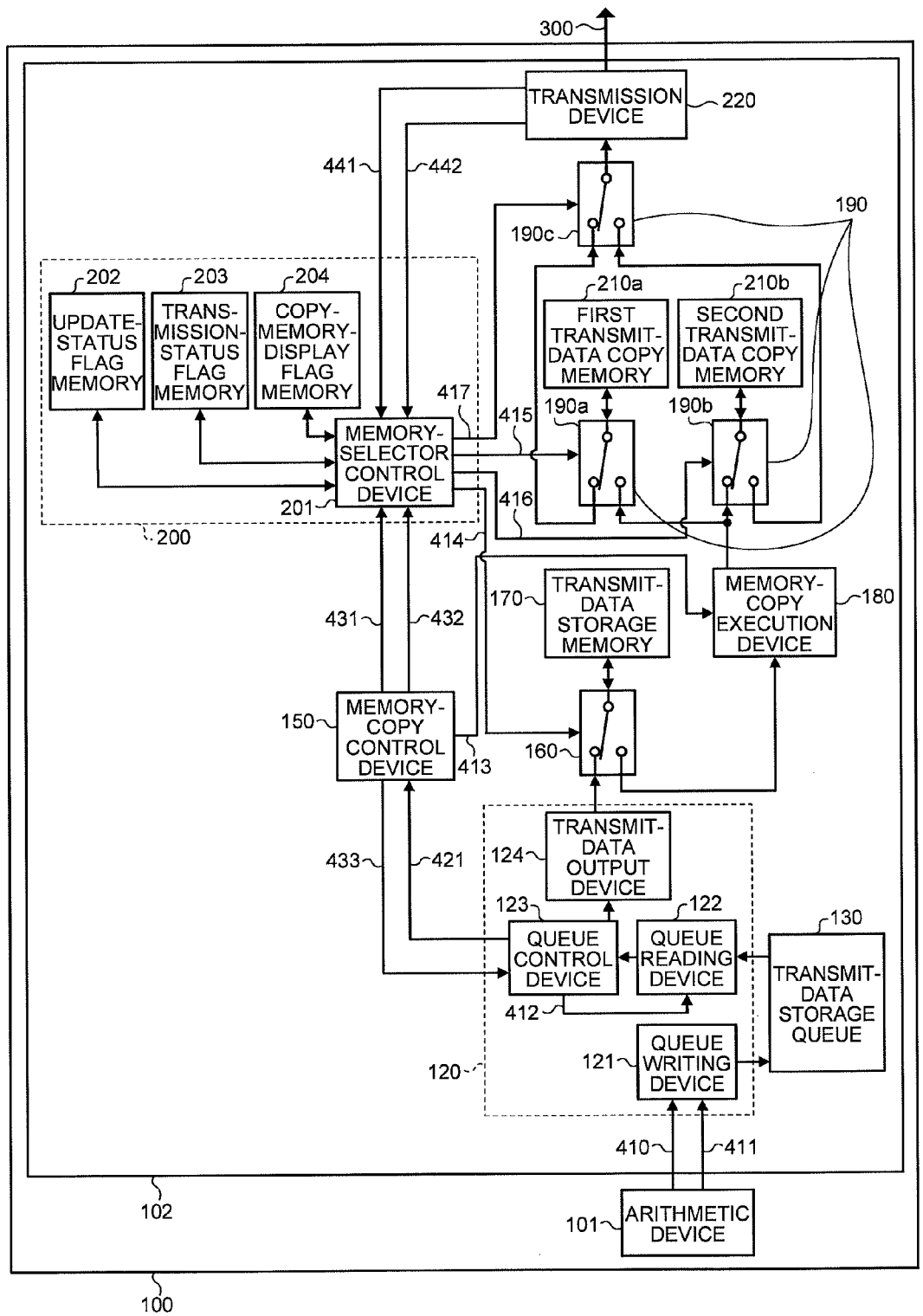
FIG. 1 is a functional block diagram of a PLC according to a first embodiment.

FIG. 1 is a functional block diagram of a PLC according to the first embodiment. A PLC 100 shown in FIG. 1 includes an arithmetic device 101 such as an MPU that generates transmit data 410, and a transmission control device 102 that collectively outputs one or plural pieces of the transmit data 410 generated by the arithmetic device 101 to a transmission line 300 as indivisible data. The transmit data 410 outputted from the transmission control device 102 are received by another PLC or device (not shown) via the transmission line 300 such as a bus.

The PLC 100 stores a system program and a control program in a memory (not shown). The arithmetic device 101 executes the control program according to the system program, thereby generating one or plural pieces of the transmit data 410. Each piece of transmit data 410 is constituted by one address and one or plural pieces of information data to be written to this address. Furthermore, the arithmetic device 101 generates the transmit data 410, and thereafter transmits the address and the data that constitute each piece of transmit data 410 to the transmission control device 102 in order, and consecutively transmits a transmission request signal 411 to the transmission control device 102.

Figure 2:
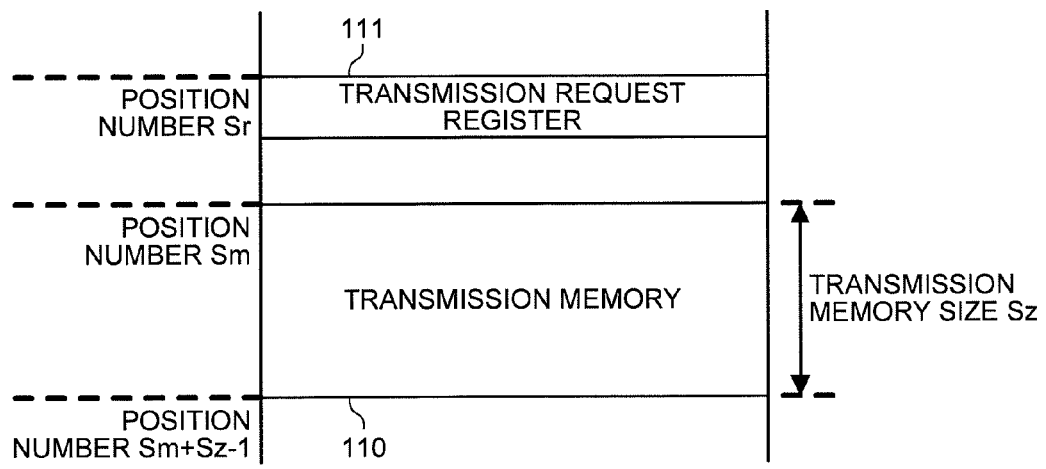
FIG. 2 is a memory map of a transmission control device 102 as viewed from an arithmetic device 101 in the first embodiment.

FIG. 2 is a memory map of the transmission control device 102 as viewed from the arithmetic device 101. A transmission memory 110 and a transmission request register 111 are allocated to this map. The arithmetic device 101 writes the transmit data 410 to the transmission memory 110, and writes the transmission request signal 411 to the transmission request register 111. The transmission memory 110 and the transmission request register 111 are virtual storage regions as viewed from the arithmetic device 101. As described later, the transmit data 410 written in the transmission memory 110 are written in a transmit-data storage memory 170 by the transmission control device 102.

A function of each of blocks that constitute the transmission control device 102 shown in FIG. 1 is described next. The transmission control device 102 can be constituted by software, hardware, or a combination thereof. First, a queue control unit 120 receives the transmit data 410 and transmission request signal 411 from the arithmetic device 101. Then, the queue control unit 120 temporarily queues the received transmit data 410 and the transmission request signal 411 in a transmit data storage queue. The queue control unit 120 stores the transmit data 410 in the transmit-data storage memory 170. That is, a position number in the transmit-data storage memory 170 is set as the address that constitutes the transmit data 410. The transmission control device 102 interprets this address as the position number in which the transmit data 410 is to be written. Furthermore, the queue control unit 120 transmits and receives control signals to/from a memory-copy control device 150. The queue control unit 120 includes a queue writing device 121, a queue reading device 122, a queue control device 123, and a transmit-data output device 124.

The queue writing device 121 writes the transmit data 410 and transmission request signal 411 received from the arithmetic device 101 in a transmit-data storage queue 130.

Figure 3:
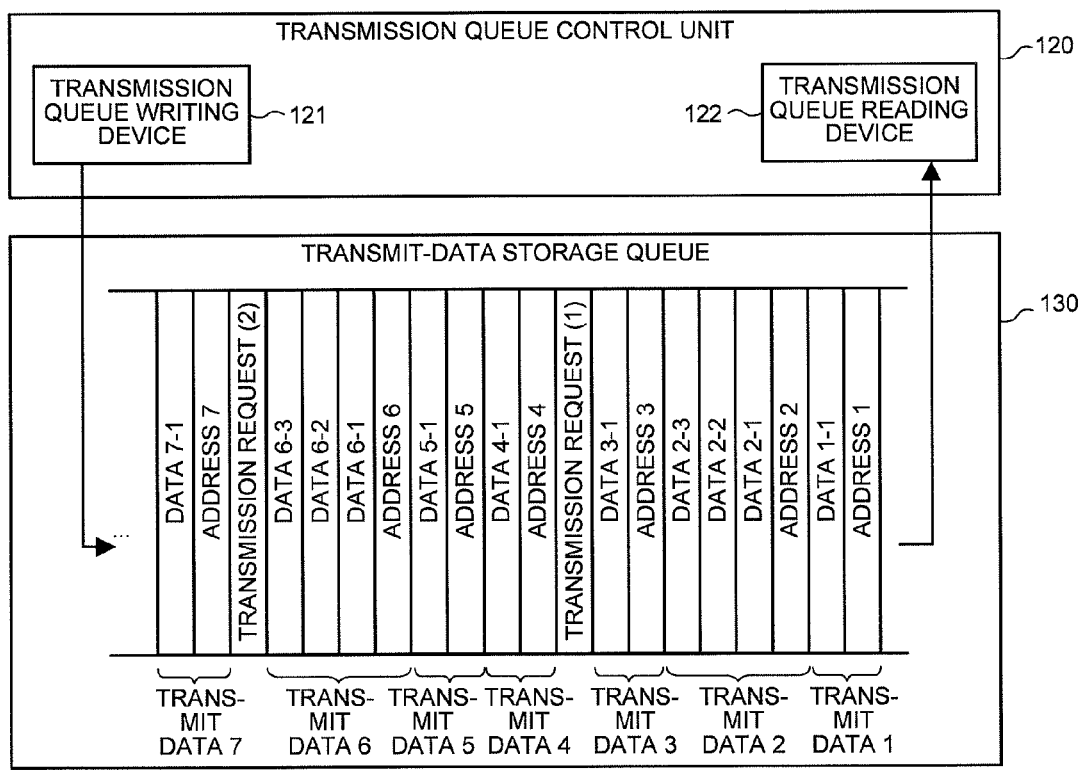
FIG. 3 is an illustration showing an example of an internal configuration of a transmit-data storage queue 130 in the first embodiment.

The transmit-data storage queue 130 temporarily stores the transmit data 410 and transmission request signal 411 written by the queue writing device 121 in a queue form. FIG. 3 is an illustration schematically showing a state where the transmit data 410 and the transmission request signal 411 are written in the transmit-data storage queue 130. The transmit-data storage queue 130 stores the transmit data 410 and the transmission request signals 411 in the order they were written, and outputs the transmit data 410 and the transmission request signals 411 in chronological order. The transmit-data storage queue 130 is configured by a FIFO, for example. A storage capacity of the transmit-data storage queue 130 is preset to be equal to or larger than a capacity with which a maximum number of the transmit data 410 and the transmission request signals 411 that can be written from the arithmetic device 101 via the queue writing device 121 can be stored in the transmit-data storage queue 130 during a period in which the queue reading device 122 does not perform reading.

The queue reading device 122 reads the transmit data 410 and the transmission request signals 411 and transmits the transmit data 410 and the transmission request signals 411 to the queue control device 123 in the order they are read, in the case where the queue control device 123 permits the queue reading device 122 to perform the reading from the transmit-data storage queue 130. On the other hand, the queue reading device 122 does not perform the reading when the queue control device 123 prohibits the reading.

When the queue reading device 122 transmits the transmit data 410 to the queue control device 123, the queue control device 123 transmits the transmit data 410 to the transmit-data output device 124. On the other hand, when the queue reading device 122 transmits the transmission request signal 411, the queue control device 123 transmits a read-operation switching signal 412 to the queue reading device 122 and prohibits the reading without transmitting the transmission request signal 411 to the transmit-data output device 124. Furthermore, the queue control device 123 requests the memory-copy control device 150 (described later) to copy the transmit data 410 from the transmit-data storage memory 170 (described later) into a transmit-data copy memory 210 (described later) by way of a memory-copy-execution request signal 421. Thereafter, when the memory-copy control device 150 notifies the queue control device 123 of completion of copying the transmit data 410 by way of a second memory-copy-completion notification signal 433, the queue control device 123 permits the queue reading device 122 to perform reading from the transmit-data storage queue 130 by way of the read-operation switching signal 412, the reading having been prohibited till that time.

The transmit-data output device 124 writes the transmit data 410 transmitted from the queue control device 123 in the transmit-data storage memory 170 via a storage memory selector 160.

The storage memory selector 160 is connected to the transmit-data storage memory 170, and switches between its connections to the transmit-data output device 124 and a memory-copy execution device 180.

The transmit-data storage memory 170 stores the transmit data 410 written by the transmit-data output device 124. When there are data already stored in the transmit-data storage memory 170, the transmit data 410 are overwritten on the already-stored data and stored in the transmit-data storage memory 170. A storage capacity of the transmit-data storage memory 170 is preset to be equal to or larger than a maximum capacity of the transmit data 410 that can be outputted to the transmission line 300 per TDMA transmission cycle. Furthermore, the storage capacity of the transmit-data storage memory 170 is identical to a transmission memory size Sz of the transmission memory 110 shown in FIG. 2.

The memory-copy execution device 180 copies the transmit data 410 stored in the transmit-data storage memory 170 into the transmit-data copy memory 210 via a copy memory selector 190.

The copy memory selector 190 is configured to include a first copy memory selector 190a, a second copy memory selector 190b, and a third copy memory selector 190c. The first copy memory selector 190a is connected to a first transmit-data copy memory 210a, and switches between its connections to the memory-copy execution device 180 and the third copy memory selector 190c. The second copy memory selector 190b is connected to a second transmit-data copy memory 210b, and switches between its connections to the memory-copy execution device 180 and the third copy memory selector 190c. The third copy memory selector 190c is connected to a transmission device 220, and switches between its connections to the first copy memory selector 190a and the second copy memory selector 190b.

The transmit-data copy memory 210 is configured to include the first transmit-data copy memory 210a and the second transmit-data copy memory 210b. The transmit-data copy memory 210 stores the transmit data 410 copied by the memory-copy execution device 180. When there are data already stored in the transmit-data copy memory 210, the transmit data 410 are overwritten on the already-stored data and stored in the transmit-data copy memory 210. A storage capacity of each of the first transmit-data copy memory 210a and the second transmit-data copy memory 210b is preset to be equal to or larger than a maximum capacity of the transmit data 410 that can be outputted to the transmission line 300 per TDMA transmission cycle similarly to the transmit-data storage memory 170. For example, the storage capacity of each of the first transmit-data copy memory 210a and the second transmit-data copy memory 210b is set to be equal to that of the transmit-data storage memory 170.

The memory-copy control device 150 transmits and receives control signals from/to other blocks. Specifically, the memory-copy control device 150 receives first the memory-copy-execution request signal 421 that is a request to copy the transmit data 410 into the transmit-data copy memory from the queue control device 123. Upon receiving the signal, the memory-copy control device 150 transmits a memory-copy-start notification signal 431 to a memory-selector control device 201 to notify the memory-selector control device 201 of start to copy the transmit data 410 from the transmit-data storage memory 170 into the transmit-data copy memory 210. Thereafter, the memory-copy control device 150 instructs the memory-copy execution device 180 to carry out copying by way of a copy execution signal 413. When the copy of the transmit data 410 is completed, the memory-copy control device 150 notifies the memory-selector control device 201 and the queue control device 123 of the completion of the copying by way of a first memory-copy completion notification signal 432 and the second memory-copy completion notification signal 433, respectively.

The transmission device 220, which is configured by, for example, a bus driver, reads the transmit data 410 from the transmit-data copy memory 210 for every predetermined TDMA transmission cycle for storing the data in the transmission device 220, and outputs the read data to the transmission line 300. At this time, before reading of the transmit data 410 starts, the transmission device 220 transmits a transmission-start notification signal 441 to the memory-selector control device 201 to notify the memory-selector control device 201 that outputting to the transmission line 300 is to be started. Furthermore, after the completion of the outputting of the transmit data 410, the transmission device 220 transmits a transmission-completion notification signal 442 to the memory-selector control device 201 to notify the memory-selector control device 201 that the outputting of the transmit data 410 has been completed.

A memory-selector control unit 200 transmits switching instructions to the storage memory selector 160 and the copy memory selector 190 based on the control signals transmitted from the memory-copy control device 150 and the transmission device 220. The memory-selector control unit 200 is configured to include an update-status flag memory 202, a transmission-status flag memory 203, a copy-memory-display flag memory 204, and the memory-selector control device 201.

The update-status flag memory 202 stores either an update flag or a non-update flag in an overwriting mode. The update flag means that, while the transmission device 220 reads the transmit data 410 from any one of the first transmit-data copy memory 210a and the second transmit-data copy memory 210b, the transmit data 410 have been copied into the other transmit-data copy memory 210 by the memory-copy execution device 180. On the other hand, the non-update flag means that, while the transmission device 220 reads the transmit data 410 from the same, the transmit data 410 have not been copied into the other transmit-data copy memory 210.

The transmission-status flag memory 203 stores either a transmission flag or a standby flag in an overwriting mode. The transmission flag means that the transmission device 220 is reading the transmit data 410 from the transmit-data copy memory 210 or outputting the read transmit data 410 to the transmission line 300. On the other hand, the standby flag means that the transmission device 220 has completed outputting the transmit data 410 and is on standby until a time-division data transmission cycle newly starts.

The copy-memory-display flag memory 204 stores either a first memory flag or a second memory flag in an overwriting mode. The first memory flag means that the memory-copy execution device 180 has stored the latest transmit data 410 in the first transmit-data copy memory 210a. The second memory flag means that the latest transmit data 410 have been stored in the second transmit-data copy memory 210b.

The memory-selector control device 201 updates the flags stored in the update-status flag memory 202, the transmission-status flag memory 203, and the copy-memory-display flag memory 204 based on the control signals transmitted from the memory-copy control device 150 and the transmission device 220. The memory-selector control device 201 also transmits switching instructions to the storage memory selector 160 and the copy memory selector 190 based on the flags.

Operations of the PLC 100 according to the first embodiment is described next with reference to FIGS. 4 to 6.

Figure 4:
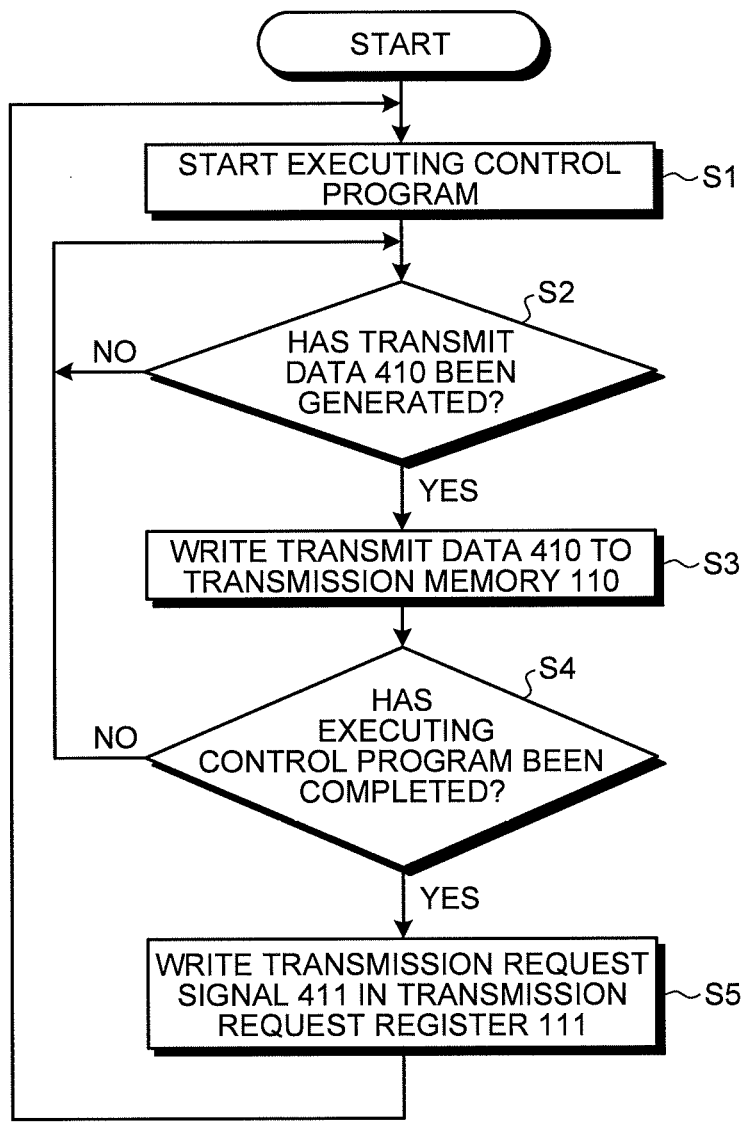
FIG. 4 is a flowchart showing processes performed by the arithmetic device 101 in the first embodiment.

FIG. 4 is a flowchart showing processes performed by the arithmetic device 101 according to the first embodiment.

First, the arithmetic device 101 starts executing the control program stored in a memory (not shown) (Step S1).

Next, the arithmetic device 101 determines whether the transmit data 410 have been generated while the control program is being executed (Step S2). When the transmit data have not been generated, the arithmetic device 101 executes Step S2 again after the end of a predetermined time or a predetermined control-program execution cycle.

On the other hand, when the transmit data 410 has been generated, the arithmetic device 101 writes the transmit data 410 generated at Step S2 in the transmission memory 110 shown in FIG. 2 (Step S3).

Next, the arithmetic device 101 determines whether or not execution of the control program has completed (Step S4), and if not completed, the arithmetic device 101 returns to Step S2. On the other hand, if it has been completed at Step S4, then the arithmetic device 101 writes the transmission request signal 411 in the transmission request register 111 (Step S5). Next, the arithmetic device 101 returns to Step S1 when a predetermined control-program execution cycle newly starts.

Figure 5:
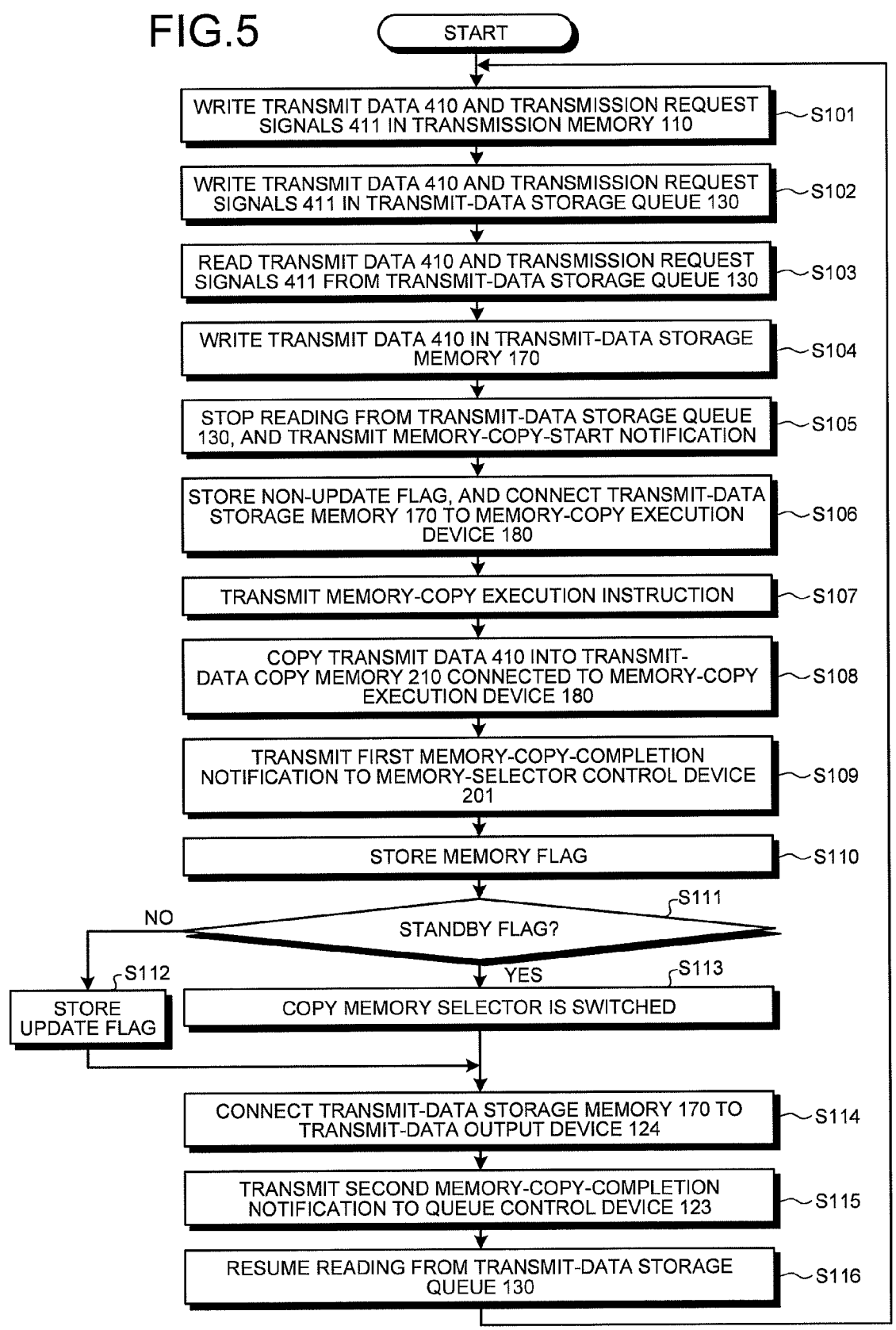
FIG. 5 is a flowchart showing processes performed by the transmission control device 102 according to the first embodiment in a case where transmit data 410 and a transmission request signal 411 are written in a transmission memory 110 by the arithmetic device 101.

FIG. 5 is a flowchart of an operation performed by the transmission control device 102 in relation to a write operation of the arithmetic device 101. Initial states of the functional blocks that constitute the transmission control device 102 are as follows. That is, the transmit-data storage queue 130 does not store any data. The queue control device 123 permits the queue reading device 122 to read data. The storage memory selector 160 connects the transmit-data storage memory 170 to the transmit-data output device 124. The copy memory selector 190 connects the memory-copy execution device 180 to the second transmit-data copy memory 210b, and connects the first transmit-data copy memory 210a to the transmission device 220. Furthermore, the transmit-data storage memory 170 and the transmit-data copy memory 210 store 0 (zero) that is an initial value of the transmit data 410 in storage regions in respective position numbers. The update-status flag memory 202 stores the non-update flag, the transmission-status flag memory 203 stores the standby flag, and the copy-memory-display flag memory stores the first memory flag.

First, when the transmit data 410 and the transmission request signals 411 are written in the transmission memory 110 shown in FIG. 2 by the arithmetic device 101 (Step S101), the queue writing device 121 writes the transmit data 410 and the transmission request signals 411 in order in the transmit-data storage queue 130 (Step S102). The queue writing device 121 performs the writing to the storage queue 130 irrespectively of a read operation of the transmission queue reading device 122. However, no data overflow occurs because the storage capacity of the transmit-data storage queue 130 is set to be equal to or larger than the maximum data capacity at which the data can be written while the transmission queue reading device 122 does not read data.

Next, because the queue reading device 122 is permitted to read the data, it reads the transmit data 410 and the transmission request signals 411 stored in the transmit-data storage queue 130 in order and transmits these to the queue control device 123 in order (Step S103).

Next, when the queue control device 123 is given one or more pieces of transmit data 410 by the queue reading device 122, the queue control device 123 transmits the transmit data 410 to the transmit-data output device 124. Then, the transmit-data output device 124 writes the transmit data 410 in the transmit-data storage memory 170 connected thereto by the storage memory selector 160 (Step S104).

The queue control device 123 is given the transmission request signal 411 from the queue reading device 122. In response, the queue control device 123 transmits the read-operation switching signal 412 to the queue reading device 122, and transmits the memory-copy-execution request signal 421 to the memory-copy control device 150 to request the memory-copy control device 150 to copy the transmit data 410 from the transmit-data storage memory 170 into the transmit-data copy memory 210 (Step S105). The queue reading device 122 breaks reading the data from the transmit-data storage queue 130 upon receiving the read-operation switching signal 412. On the other hand, the memory-copy control device 150 transmits the memory-copy-start notification signal 431 to the memory-selector control device 201 upon receiving the memory-copy-execution request signal 421.

Next, in response to the memory-copy-start notification signal 431, the memory-selector control device 201 stores the non-update flag in the update-status flag memory 202 and transmits a storage-memory switching signal 414 to the storage memory selector 160 (Step S106). In response to the storage-memory switching signal 414, the storage memory selector 160 switches between its connections to the transmit-data output device 124 and the memory-copy execution device 180 to connect the transmit-data storage memory 170 to the memory-copy execution device 180. By storing the non-update flag at S106, even if the transmission device 220 has completed outputting the transmit data 410 to the transmission line 300 while the memory-copy execution device 180 executes copying, it is possible to prevent the copy memory selector 190 from being switched. This can guarantee the simultaneity of the indivisible data.

Next, the memory-copy control device 150 transmits the copy execution signal 413 to the memory-copy execution device 180 (Step S107). In response to the copy execution signal 413, the memory-copy execution device 180 copies the transmit data 410 stored in the transmit-data storage memory 170 into the second transmit-data copy memory 210b connected to the memory-copy execution device 180 via the second copy memory selector 190b (Step S108). When the copying has been completed, the memory-copy control device 150 transmits the first memory-copy-completion notification signal 432 to the memory-selector control device 201 (Step S109).

The memory-selector control device 201 stores the second memory flag in the copy-memory-display flag memory 204 in response to the first memory-copy-completion notification signal 432 (Step S110). The memory flag stored at Step S110 corresponds to the transmit-data copy memory 210 into which the transmit data 410 is copied at Step S108. That is, the first memory flag is stored when the data are copied into the first transmit-data copy memory 210a, and the second memory flag is stored when the data are copied into the second transmit-data copy memory 210b.

Next, the memory-selector control device 201 refers to the transmission-status flag memory 203 (Step S111). When the transmission flag is stored at Step S111, the memory-selector control device 201 stores the update flag in the update-status flag memory 202 (Step S112). The fact that the transmission flag has been stored is equivalent to that the transmission device 220 reads the transmit data 410 from the first transmit-data copy memory 210a or outputs the read transmit data 410 to the transmission line 300. Accordingly, if the copy memory selector 190 is switched in this condition, it is impossible to guarantee the simultaneity of the transmit data 410 that are the indivisible data. Therefore, by storing the update flag at Step S112, the memory-selector control device 201 can recognize that it is necessary for the copy memory selector 190 to be switched after the transmission device 220 outputs the transmit data 410 to the transmission line 300.

On the other hand, when the standby flag is stored at Step S111, the memory-selector control device 201 transmits a switching instruction to the copy memory selector 190 (Step S113). That is, the memory-selector control device 201 outputs a first copy-memory switching signal 415, a second copy-memory switching signal 416 and a third copy-memory switching signal 417. In response to these switching signals, the first copy memory selector 190a connects the first transmit-data copy memory 210a to the memory-copy execution device 180, the second copy memory selector 190b connects the second transmit-data copy memory 210b to the third copy memory selector 190c, and the third copy memory selector 190c connects the second copy memory selector 190b to the transmission device 220.

Next, the memory-selector control device 201 transmits the storage-memory switching signal 414 to the storage memory selector 160 (Step S114). In response, the storage memory selector 160 connects the transmit-data storage memory 170 to the transmit-data output device 124.

The memory-copy control device 150 transmits the second memory-copy-completion notification signal 433 to the queue control device 123 (Step S115).

The queue control device 123 transmits the read-operation switching signal 412 to the queue reading device 122 in response to the second memory-copy-completion notification signal 433 (Step S116). Accordingly, the queue control unit 120 resumes reading the data from the transmit-data storage queue 130. Thereafter, the transmission control device 102 returns to Step S101.

Figure 6:
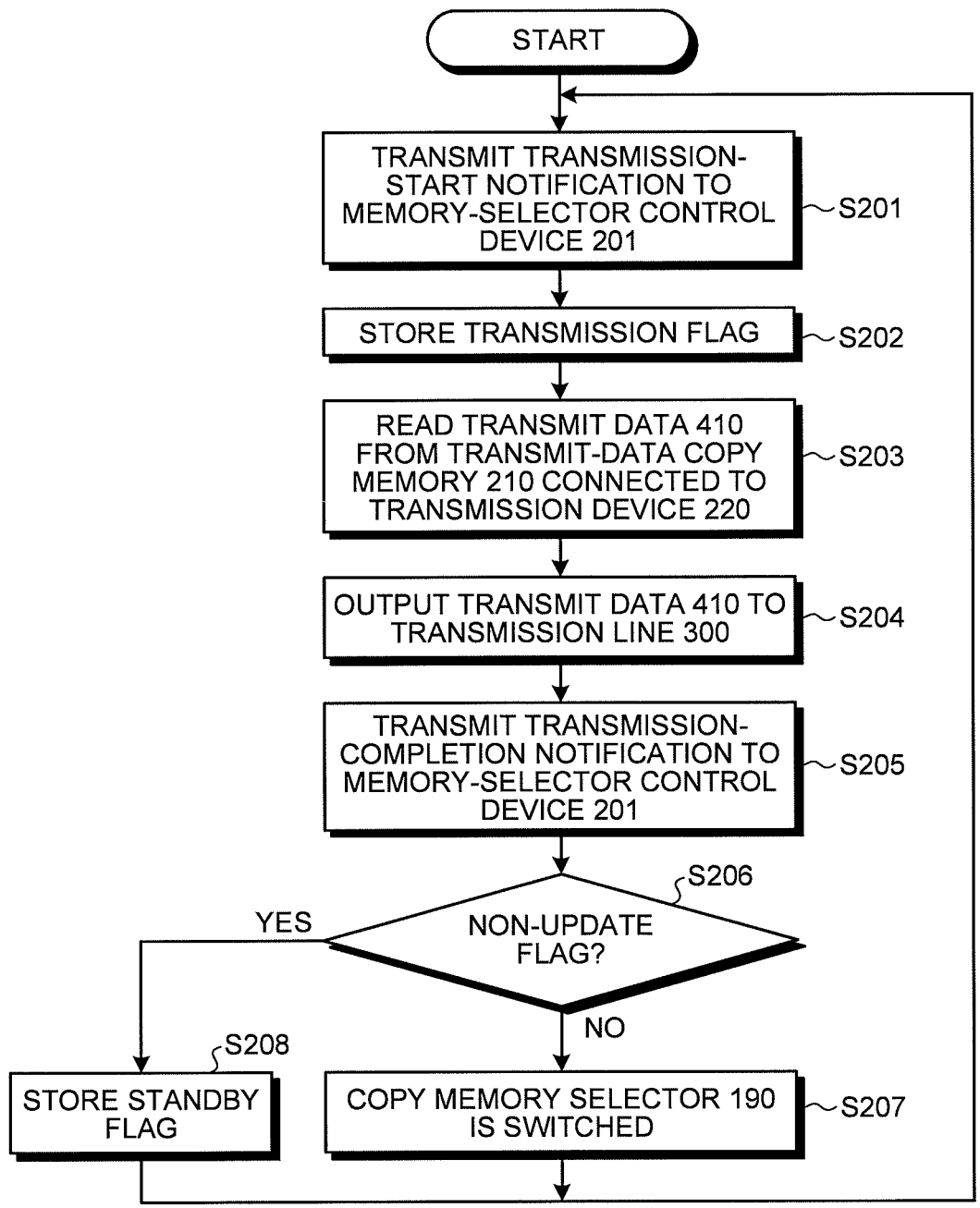
FIG. 6 is a flowchart showing processes performed by the transmission control device 102 according to the first embodiment in relation to reading and outputting of the transmit data 410 performed by a transmission device 220 for every time-division transmission cycle.

FIG. 6 is a flowchart showing an operation performed by the transmission control device 102 in relation to a read operation and an output operation for the transmit data 410, performed by the transmission device 220. It is noted that an initial stat herein is equal to that described in FIG. 5, and so its description will be omitted.

First, the transmission device 220 transmits the transmission-start notification signal 441 to the memory-selector control device 201 (Step S201).

Next, the memory-selector control device 201, upon receiving the transmission-start notification signal 441, overwrites and stores the transmission flag in the transmission-status flag memory 203 that stores the standby flag (Step S202).

Subsequently, the transmission device 220 reads the transmit data 410 from the first transmit-data copy memory 210a connected to the transmission device 220 via the first copy memory selector 190a and the third copy memory selector 190c (Step S203). Then, the transmission device 220 outputs the transmit data 410 to the transmission line 300 (Step S204). When the outputting has been completed, the transmission device 220 transmits the transmission-completion notification signal 442 to the memory-selector control device 201 (Step S205).

The memory-selector control device 201 refers to the update-status flag memory 202 in response to the transmission-completion notification signal 442 (Step S206). When the non-update flag is stored at Step S206, the memory-selector control device 201 stores the standby flag in the transmission-status flag memory 203.

On the other hand, when the update flag is stored at Step S206, the memory-selector control device 201 issues a switching instruction to the copy memory selector 190 (Step S207). The fact that the update flag is stored herein is equivalent to that the latest transmit data 410 has been copied into the second transmit-data copy memory 210b by the memory-copy execution device 180 while the transmission device 220 is outputting the transmit data 410. That is why the switching instruction is issued to the copy memory selector 190. That is, the memory-selector control device 201 outputs the first copy-memory switching signal 415, the second copy-memory switching signal 416, and the third copy-memory switching signal 417. In response to these switching signals, the first copy memory selector 190a connects the first transmit-data copy memory 210a to the memory-copy execution device 180, the second copy memory selector 190b connects the second transmit-data copy memory 210b to the third copy memory selector 190c, and the third copy memory selector 190c connects the second copy memory selector 190b to the transmission device 220.

The transmission device 220 returns to Step S201 when a predetermined TDMA transmission cycle newly starts.

This TDMA transmission cycle is set to be longer than a time interval since the memory-copy control device 150 transmits the memory-copy-start notification signal 431 to the memory selector control device 201 until the memory-copy control device 150 transmits the first memory-copy-completion notification signal 432 to the memory-selector control device 201. That is, after the transmit data 410 stored in the transmit-data storage memory 170 are all copied into the transmit-data copy memory 210, a new TDMA transmission cycle starts. This can prevent the transmission device 220 from outputting non-latest transmit data 410 to the transmission line 300 a plurality of times.

In the first embodiment, the transmission control device 102 repeats the operation shown in FIG. 6 for every predetermined TDMA transmission cycle set in the transmission device 220, but the invention is not limited thereto. For example, timing with which the transmission device 220 starts the operation shown in FIG. 6 may be stored in the memory-copy control device 150 in advance, and the transmission control device 102 may be configured to perform the operation shown in FIG. 6 according to this timing. Alternatively, the transmission control device 102 may start the operation shown in FIG. 6 in accordance with an input signal to the transmission device 220 from outside.

In the first embodiment, the transmit data 410 and the transmission request signals 411 are stored in the transmit-data storage queue 130 in a queue form, thereby identifying a range of the indivisible data, but the invention is not limited thereto. For example, the range of the indivisible data may be identified by attaching serial numbers to the transmit data 410 stored in the transmit-data storage queue 130 and storing a serial number at the time the transmission request signal 411 is received, in another memory.

In the first embodiment, it has been described that the transmit-data copy memory 210 is configured by two transmit-data copy memories. However, the number of the transmit-data copy memories is not limited to two but three or more transmit-data copy memories can constitute the transmit-data copy memory 210. In this case, the transmission device 220 reads the transmit data 410 from the respective transmit-data copy memories in the transmit-data copy memory 210 and outputs the read transmit data 410 to the transmission line 300 in order of the transmit data 410 having been copied by the memory-copy execution device 180.

According to the first embodiment, even if writing the transmit data that is the indivisible data in the transmission control device by the arithmetic device and outputting the transmit data to the transmission line by the transmission control device are performed asynchronously, it is possible to prevent access contention between the writing and reading of the transmit data while guaranteeing the simultaneity of the indivisible data. This can reduce the standby time during the writing or reading of the transmit data, and reduce the control program execution cycle. Furthermore, when a transmission request signal is written from the arithmetic device while the transmission device reads the transmit data from one of the first and second transmit-data copy memories and outputs the read transmit data to the transmission line, new transmit data can be copied into the other transmit-data copy memory. After that, when the next transmission request signal is further written, it is possible to discard the transmit data already copied into the other transmit-data copy memory and to copy the new transmit data into the other transmit-data copy memory. It is thereby possible to reduce the delay in the output of the transmit data to the transmission line even if the transmission request signal is written from the arithmetic device in a shorter cycle than the time-division transmission cycle in which the transmission device outputs the transmit data to the transmission line.

Second Embodiment

In the first embodiment, when the arithmetic device 101 writes the transmit data 410 in the transmission control device at Step S101 shown in FIG. 5, the transmit data 410 are temporarily written in the transmit-data storage queue 130 at Step S102, written in the transmit-data storage memory 170 at Step S104, and copied into the transmit-data copy memory 210 at Step S108. However, when the arithmetic device 101 thereafter attempts to read the transmit data 410 from the transmission control device, the arithmetic device 101 is often unable to read the transmit data 410 because the transmit data 410 has been already read from the transmit-data storage queue 130 if the a destination to which the arithmetic device 101 reads the transmit data 410 is set to the transmit-data storage queue 130. Furthermore, when the destination to which the data are read out is the transmit-data storage memory 170 or the transmit-data copy memory 210, old transmit data 410 may be read out because the transmit data 410 are accumulated in the transmit-data storage queue 130 while the queue reading device 122 is prohibited from reading the data from the transmit-data storage queue 130. A second embodiment is intended to solve these problems. The second embodiment of the present invention is described with reference to FIG. 7.

Figure 7:
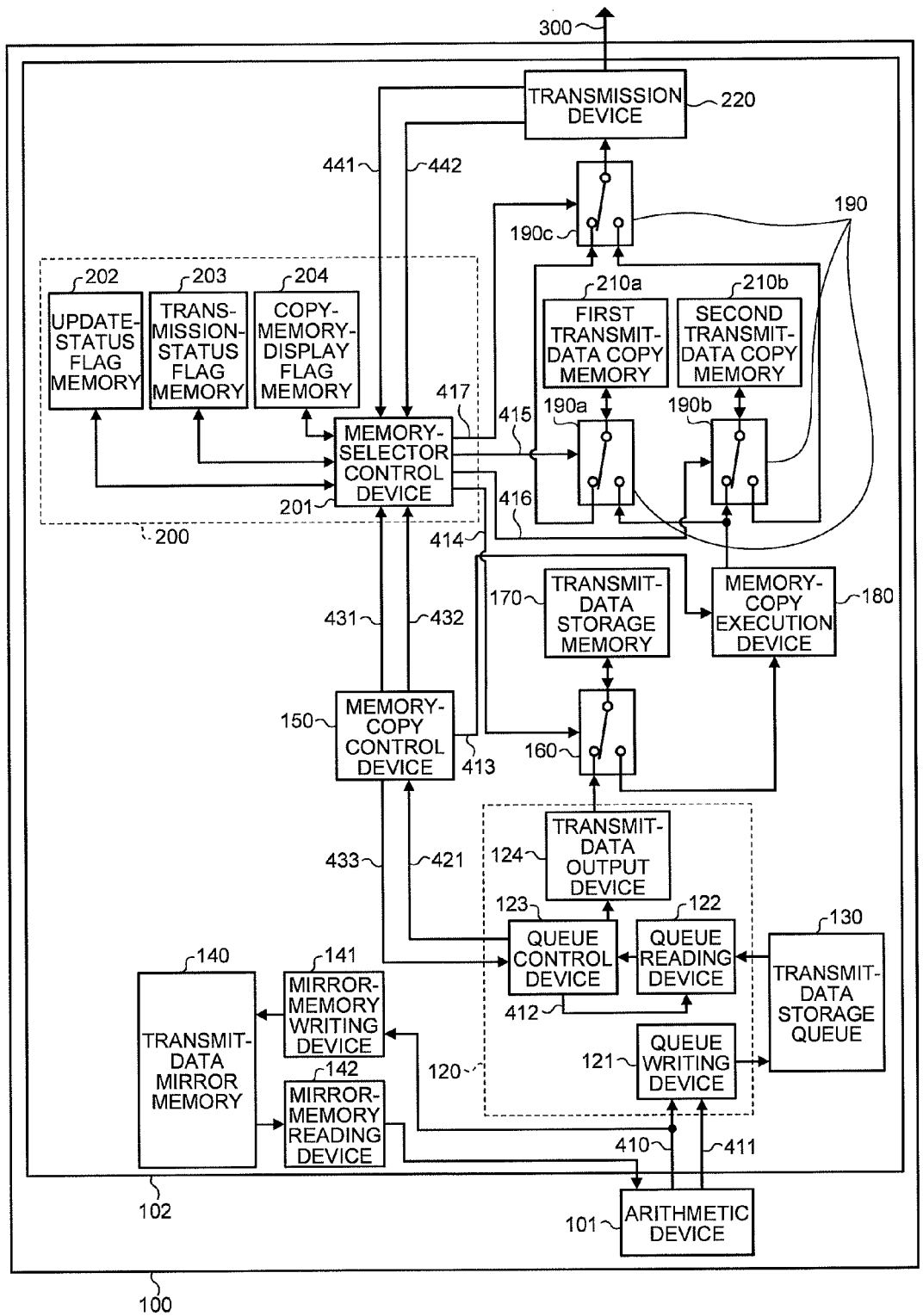
FIG. 7 is a functional block diagram of a programmable logic controller according to a second embodiment.

FIG. 7 is a functional block diagram of a PLC according to the second embodiment and corresponds to FIG. 1 according to the first embodiment. Elements in the first embodiment that are different from those shown in FIG. 1 are mainly explained below.

A mirror-memory writing device 141 writes the transmit data 410 in a transmit-data mirror memory 140, described later, when the transmit data 410 and the transmission request signal 411 are written in the transmission memory 110 shown in FIG. 2 by the arithmetic device 101.

The transmit-data mirror memory 140 stores a copy of the transmit data 410 written by the mirror-memory writing device 141. A storage capacity of the transmit-data mirror memory 140 is set to be equal to or larger than the maximum capacity of the transmit data, at which one or more pieces of the transmit data 410 can be outputted to the transmission line 300 as indivisible data for one time-division transmission cycle, as with the transmit-data storage memory 170.

A mirror-memory reading device 142 reads the transmit data 410 from the transmit-data mirror memory 140 and transmits the read transmit data 410 to the arithmetic device 101, when the transmit data 410 written in the transmission memory 110 shown in FIG. 2 are read out by the arithmetic device 101.

Herein, even if the transmit data 410 written in the transmission memory 110 shown in FIG. 2 by the arithmetic device 101 is temporarily stored in the transmit-data storage queue 130, the transmit data 410 is thereafter not stored in the transmit-data storage queue 130 when the transmit data 410 have been read from the transmit-data storage queue 130 for storing the transmit data 410 in the transmit-data storage memory 170.

On the other hand, the second embodiment exhibits the following advantageous effects in addition to advantageous effects of the first embodiment. When the arithmetic device reads the transmit data written in an transmission control device, it is possible to accurately and promptly read the transmit data no matter where the transmit data are currently stored in the transmit-data storage queue, the transmit-data storage memory or the transmit-data copy memory.

In the present embodiment, it is described that the transmission system is the TDMA system, but the invention is not necessarily limited to the TDMA. For example, a CDMA system or simple FDMA system may be adopted as the transmission system as long as the transmission system is adapted to transmit the data asynchronously with the control program. Needless to mention, the present invention is also applicable to these systems and in any of these systems the same effects as those of the present embodiment to which the TDMA system is applied can be achieved.

The copy memory selector 190 and the memory-selector control unit 200 correspond to an unread copy-memory selection unit and a read copy-memory selection unit, the memory-copy execution device 180 corresponds to a memory copy unit, and the transmission device 220 corresponds to a data output unit. Furthermore, the transmit-data storage memory 170, the transmit-data storage queue 130, the queue control device 123, the transmit-data mirror memory 140, the mirror-memory writing device 141, and the mirror-memory reading device 142 collectively constitute a memory control device.

The invention claimed is:

1. A transmission control device comprising:
a data storage memory in which data are written;
a plurality of data copy memories into which the data written in the data storage memory are copied;
an unread copy-memory selection unit that selects a first data copy memory from which the data is not read out, from among the data copy memories;
a memory copy unit that copies data written in the data storage memory into the first data copy memory selected by the unread copy-memory selection unit;
a read copy-memory selection unit that is on standby until the memory copy unit has completed copying data, and selects the first data copy memory into which the data has been copied when the memory copy unit has completed copying the data; and
a data output unit that reads data from the first data copy memory selected by the read copy-memory selection unit and outputs the read data to a transmission unit.

2. The transmission control device according to claim 1, further comprising:
a data storage queue that stores data inputted from outside in a queue form until the queue is given a transmission request signal from outside; and
a data writing unit that reads data stored in the data storage queue and writes the read data in the data storage memory when copying of the data written in the data storage memory is not performed.

3. The transmission control device according to claim 2, wherein the data storage memory is able to store plural pieces of data by overwriting written data at an arbitrary address.

4. A Programmable Logic Controller (PLC) comprising:
the transmission control device according to claim 2; and
an arithmetic unit that executes a control program to generate data, inputs the generated data to the transmission control device, and then transmits a transmission request signal to the transmission control device.

5. The transmission control device according to claim 1, wherein the data storage memory is able to store plural pieces of data by overwriting written data at an arbitrary address.

6. A Programmable Logic Controller (PLC) comprising:
the transmission control device according to claim 5; and
an arithmetic unit that executes a control program to generate data, inputs the generated data to the transmission control device, and then transmits a transmission request signal to the transmission control device.

7. A Programmable Logic Controller (PLC) comprising:
the transmission control device according to claim 1; and
an arithmetic unit that executes a control program to generate data, inputs the generated data to the transmission control device, and then transmits a transmission request signal to the transmission control device.

8. The transmission control device according to claim 1, wherein:
the data is indivisible data output by an arithmetic unit of a programmable logic control (PLC) that has the transmission control device,
the data output unit asynchronously outputs the data from the data copy memory to a bus for transmission to another PLC, and
the data copy memory is an intermediate memory which stores the data from the data storage memory and which provides the stored data to the data output unit.

9. The transmission control device according to claim 1, further comprising: a memory selector controller configured to select a memory from a plurality of data copy memories based on at least one flag, wherein the at least one flag identifies which one of the plurality of copy memories the data was most recently copied to.

10. The transmission control device according to claim 1, further comprising:
an update-status flag memory configured to store one of an update flag which indicates that the data has been copied into a second data copy memory selected from among the plurality of data copy memories when the transmission control device reads the data from one of the plurality of data copy memories and a non-update flag which indicates an overwrite mode such that while the transmission control device reads the data from one of the plurality of data copy memories, the data has not been copied into said second data copy memory;
a transmission-status flag memory configured to store one of a transmission flag which indicates that the data output unit is reading the data from the first data copy memory or outputting the read data to the transmission unit and a standby flag which indicates that the data output unit is in a standby state; and
a copy-memory display flag memory configured to store one of a first memory flag which indicates that the first data copy memory from among the plurality of data copy memories has stored the data of the data storage memory and a second memory flag which indicates that the second data copy memory from the plurality of data copy memories has stored the data of the data storage memory.

11. The transmission control device according to claim 1, further comprising a plurality of transmit-data mirror memories into which the data is written at same time as in the data storage memory and wherein the data from the transmit-data mirror memories are transmitted to an arithmetic device.

12. The transmission control device according to claim 1, wherein:
the memory copy unit copies whole of the data written in the data storage memory into the data copy memory selected by the unread copy-memory selection unit, and
the data output unit reads whole of the data from the data copy memory selected by the read copy-memory selection unit and outputs the read data collectively to the transmission unit.

13. The transmission control device according to claim 1, wherein, when reading of the data from the first and second data copy memories and the outputting of the data to the transmission unit are not being performed, the read copy-memory selection unit selects the first data copy memory into which the data has been copied to output the data to the data output unit.

14. A memory control device comprising:
a data storage memory in which data are written;
a data storage queue that stores data inputted from outside in a queue form until the queue is given a transmission request signal from outside;
a queue control unit that reads data from the data storage queue and writes the read data in the data storage memory;
a data mirror memory that stores a copy of the inputted data stored in the data storage memory;
a mirror-memory writing unit that copies the inputted data stored in the data storage memory and writes the copied data in the data mirror memory; and
a data-mirror-memory reading unit that reads the data stored in the data mirror memory and outputs the read data to outside,
wherein the data-mirror-memory reading unit is configured to read and output the data independently from the queue control unit reading and writing the data.

15. A transmission control device comprising the memory control device according to claim 14.

16. The transmission control device according to claim 15, wherein the data storage memory is able to store plural pieces of data by overwriting written data at an arbitrary address.

17. A Programmable Logic Controller (PLC) comprising:
the transmission control device according to claim 15; and
an arithmetic unit that executes a control program to generate data, inputs the generated data to the transmission control device, and then transmits a transmission request signal to the transmission control device.

* * * * *